US011173401B1

(12) United States Patent
Linden

(10) Patent No.: US 11,173,401 B1
(45) Date of Patent: Nov. 16, 2021

(54) SYSTEMS AND METHODS FOR ADJUSTING PREVIOUSLY-MADE MODIFICATIONS OF GAME ASSETS BASED ON CHANGES IN THE OWNERSHIP OF TRADEABLE ITEMS

(71) Applicant: Mythical, Inc., Sherman Oaks, CA (US)

(72) Inventor: John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 97 days.

(21) Appl. No.: 16/747,891

(22) Filed: Jan. 21, 2020

(51) Int. Cl.
*G06T 15/00* (2011.01)
*A63F 13/60* (2014.01)
*A63F 13/30* (2014.01)
*A63F 13/79* (2014.01)

(52) U.S. Cl.
CPC .............. *A63F 13/60* (2014.09); *A63F 13/30* (2014.09); *A63F 13/79* (2014.09); *A63F 2300/40* (2013.01); *A63F 2300/5546* (2013.01); *A63F 2300/6009* (2013.01)

(58) Field of Classification Search
None
See application file for complete search history.

(56) References Cited

U.S. PATENT DOCUMENTS

| | | | | |
|---|---|---|---|---|
| 7,314,407 B1 * | 1/2008 | Pearson | ................... | A63F 13/12 463/7 |
| 8,523,648 B2 * | 9/2013 | Gilson | .................... | A63F 13/40 463/11 |
| 10,946,291 B1 * | 3/2021 | Harris | ................... | A63F 13/352 |
| 2002/0028710 A1 * | 3/2002 | Ishihara | .................. | A63F 13/80 463/44 |
| 2004/0166913 A1 * | 8/2004 | Shinoda | .................. | A63F 13/80 463/1 |
| 2005/0059483 A1 * | 3/2005 | Borge | ................... | A63F 13/335 463/29 |
| 2006/0068860 A1 * | 3/2006 | Ueshima | ............... | A63F 13/213 463/1 |
| 2007/0202952 A1 | 8/2007 | Francis | | |
| 2007/0211047 A1 * | 9/2007 | Doan | .................. | A63F 3/00643 345/419 |

(Continued)

*Primary Examiner* — Lawrence S Galka
(74) *Attorney, Agent, or Firm* — Esplin & Associates, PC

(57) ABSTRACT

Systems and methods for modifying game assets based on tradeable items that are associated with user accounts of users of an online gaming platform are disclosed. Exemplary implementations may: store item information, asset information, user inventories, item-account connections, and item-asset connections; obtain first item identifier, of first tradeable item from a client computing platform of a second user; obtain, by the first item identifier, first modification information; obtain second user information; link the first tradeable item with the second user account, establishing a second item-account connection; store the second item-account connection; receive, from the client computing platform, indication of a selection of a second game asset to be modified based on the first modification information, establishing a second item-asset connection; record the second item-asset connection; perform second modification, based on the first modification information, of the second attribute information; and adjust a first modification of first attribute information of a first game asset.

18 Claims, 7 Drawing Sheets

(56) References Cited

U.S. PATENT DOCUMENTS

| | | | |
|---|---|---|---|
| 2010/0029380 A1* | 2/2010 | Rhoads | A63F 13/10 |
| | | | 463/29 |
| 2010/0229106 A1* | 9/2010 | Lee | A63F 13/12 |
| | | | 715/757 |
| 2014/0333025 A1 | 11/2014 | Amireh | |
| 2016/0287998 A1* | 10/2016 | Kawanabe | A63F 9/24 |
| 2018/0043259 A1 | 2/2018 | Wong | |

* cited by examiner

SYSTEMS AND METHODS FOR ADJUSTING PREVIOUSLY-MADE MODIFICATIONS OF GAME ASSETS BASED ON CHANGES IN THE OWNERSHIP OF TRADEABLE ITEMS

FIELD OF THE DISCLOSURE

The present disclosure relates to systems and methods for modifying game assets of an online gaming platform based on changes in ownership of tradeable items between users of the online gaming platform.

BACKGROUND

Distributed ledgers are known techniques to produce a secure record or registry of ownership of assets, transactions, and other information. For example, a distributed blockchain can be used to maintain a distributed ledger. Blockchain technology is known, e.g., as used for cryptocurrencies, smart contracts, and other applications for a decentralized database.

SUMMARY

One aspect of the present disclosure relates to modifying in-game assets based on ownership of real-world items changing between users. The game assets may include one or more virtual items (e.g., characters, weapons, vehicles, etc.) that a user may use or put into play within a gaming platform. The items may include, for example, toy figurines, playing cards, coins, and/or other real-world physical items. An item may be associated with modifications that may be effectuated upon the game assets. The item may have previously been connected with a previous user account of a previous user. A previous game asset may have been chosen (by the previous user) from an inventory included in the previous user account to be modified in accordance with the connected item. Thus, a previous modification may have been performed upon one or more attributes of the previous game asset. Subsequently, a subsequent user may purchase, trade, and/or discover the same item and subsequently link a user account of the subsequent user with the item. Documentation and/or proof of the linkages may be stored to, for example, a distributed ledger. The user account of the subsequent user may include an inventory of game assets belonging to the subsequent user within the gaming platform. The subsequent user may select a subsequent game asset from the inventory to acquire the modifications associated with the item. The selection of the subsequent game asset may be recorded to the distributed ledger. The selected subsequent game asset may be modified based on the modifications associated with the item. The modifications may be a function of or take into consideration previous game assets the item has been linked with and statistics thereof, previous user accounts the item has been linked with and statistics thereof, previous and current locations of the item, and/or other factors. Lastly, the previous modification performed upon the previous game asset may be adjusted in response to the subsequent game asset being modified based on the modifications associated with the item.

One aspect of the present disclosure relates to a system configured for modifying game assets of an online gaming platform based on tradeable items that are associated with user accounts of users of the online gaming platform. The system may include one or more hardware processors configured by machine-readable instructions. The computer components may include one or more of an obtain component, an account link component, an asset link component, a modify component, game component, and/or other computer components.

Electronic storage may be configured to store item information, asset information, user inventories, item-account connections, and item-asset connections. The item information may be associated with the tradeable items. The tradeable items may be real-world physical items that include a first tradeable item. The item information may include item identifiers that identifies individual tradeable items. The item information may include modification information that defines modification which are applicable to the individual game assets. The individual game assets may be defined by asset information. The asset information may include attribute information. The attribute information may define types, uses, impacts of the game assets and/or others of the individual game assets. The user inventories indicate the game assets that are owned and/or possessed by the individual users within the online gaming platform. The item-account connections are established connections between the tradeable items and the user accounts of the users of the online gaming platform. The item-asset connections are established connections between the tradeable items and the game assets. Upon established item-asset connections, the modification information is applied to the individual game assets.

In some implementations, a first tradeable item may be associated with first item information. The first item information may include a first item identifier that identifies the first tradeable item and first modification information. A first item-account connection may have been established between the first tradeable item and a first user account of a first user. The first user account may include a first inventory of game assets including a first game asset. First attribute information may pertain to the first game asset and may define type, uses, and impacts of the first game asset. A first item-asset connection has been established between the first tradeable item and the first game asset. A first modification may be performed of the first attribute information based on the first modification information such that the first game asset may be modified in accordance with the first tradeable item.

In some implementations, the obtain component may be configured to obtain the first item identifier of the first tradeable item from a client computing platform associated with a second user.

In some implementations, the modify component may be configured to obtain the first modification information from the electronic storage. The first modification information may be obtained by the first item identifier.

In some implementations, the obtain component may be configured to obtain second user information of a second user account. The second user account may be associated with the second user. The second user account may include a second inventory of game assets.

In some implementations, the account link component may be configured to link the first tradeable item with the second user account within the online gaming platform such that a second item-account connection is established. The linkage may be responsive to obtaining the first item identifier and the second user information. The account link component may be configured to store the second item-account connection.

In some implementations, the asset link component may be configured to receive, from the client computing platform, an indication of a selection of a second game asset from the second inventory of game assets to be modified based on the first modification information. The asset link component may be configured to link the second game asset with the first tradeable item such that a second item-asset connection is established. The asset link component may be configured to record, to a distributed ledger, the second item-asset connection indicating the second game asset as being modified in accordance with the first tradeable item. The second game asset may include second asset information. The second asset information may include second attribute information.

In some implementations, the modify component may be configured to perform a second modification, based on the first modification information, the second attribute information in accordance with the first tradeable item such that the second game asset is modified. The modify component may be configured to adjust the first modification. The adjustment may be based on the establishment of the second item-asset connection.

As used herein, any association (or relation, or reflection, or indication, or correspondency) involving servers, processors, client computing platforms, virtual items, user accounts, inventories, game assets, tradeable items, item identifiers, indications, linkage, recordings, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
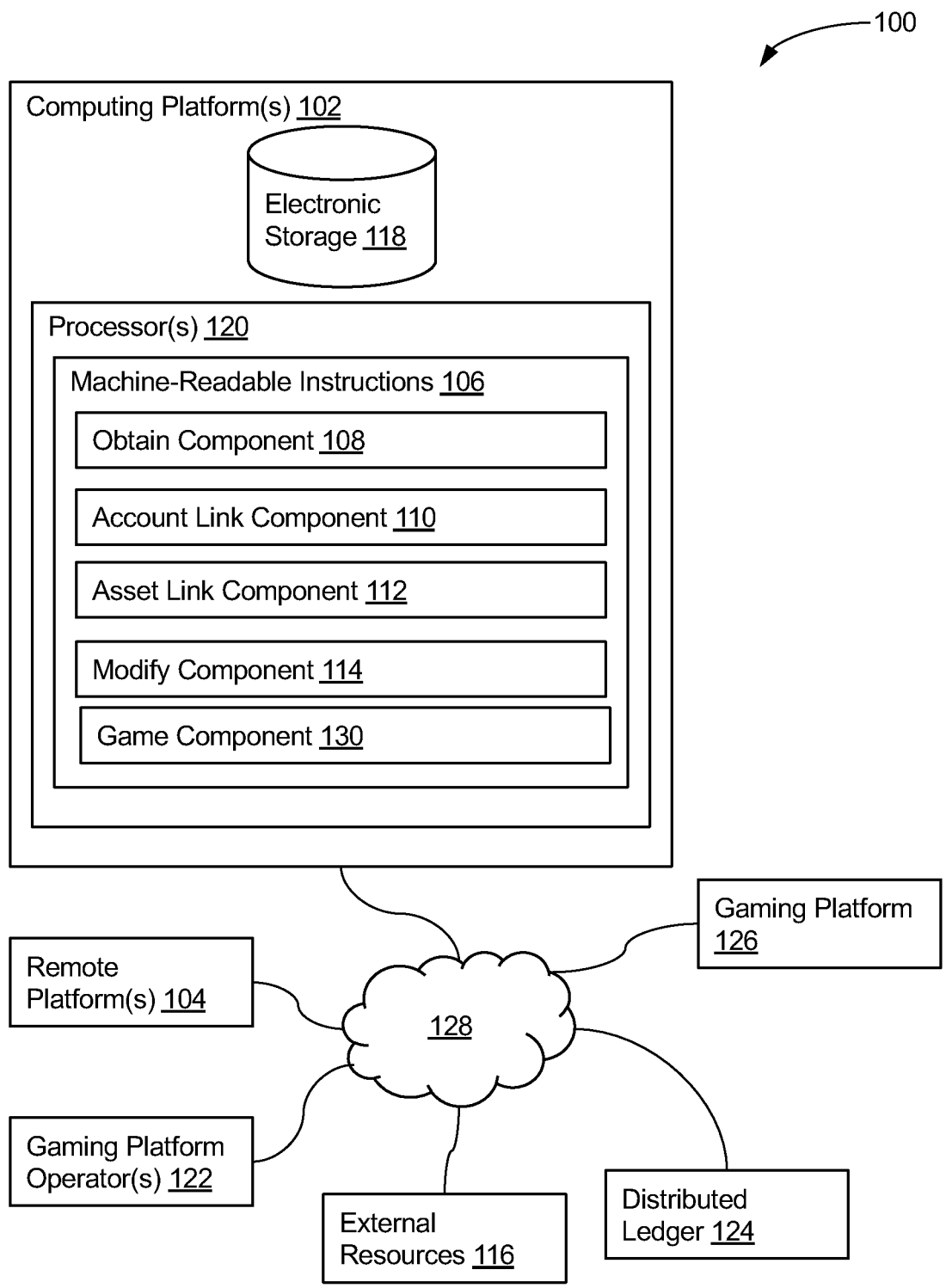
FIG. 1 illustrates a system configured for modifying game assets of an online gaming platform based on changes in ownership of tradeable items of users of the online gaming platform, in accordance with one or more implementations.

FIG. 1 illustrates a system 100 configured for modifying game assets of an online gaming platform based on changes in ownership of tradeable items of users of the online gaming platform, in accordance with one or more implementations. Users can trade the individual physical tradeable items and establish a connection with an individual virtual game asset to modify (e.g., enhance) one or more in-game attributes of the selected game asset. In some implementations, system 100 may include one or more of servers 102. Server(s) 102 may be configured to communicate with one or more client computing platforms 104 according to a client/server architecture and/or other architectures via one or more network(s) 128. In some implementations, one or more network(s) 128 may include the Internet and/or other networks. Client computing platform(s) 104 may be configured to communicate with other client computing platforms via server(s) 102 and/or according to a peer-to-peer architecture, a client-server architecture, and/or other architectures. Users may access system 100 via client computing platform(s) 104.

In some implementations, system 100 and/or server(s) 102 may be configured to communicate with one or more of (online) gaming platform(s) 126, gaming platform operator(s) 122, distributed ledger 124, and/or other components via one or more network(s) 128. As used herein, gaming platform 126 may refer to either an individual game, a type of gaming console, its ecosystem, and/or any combination of these. Gaming platform 126 may include one or more (online) games. Gaming platform operator 122 may refer to a host, operator, owner, and/or other stakeholder of gaming platform 126.

In some implementations, distributed ledger 124 (e.g., a blockchain or another structure of blocks) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of distributed ledger(s) 124. The smart contracts may be stored on distributed ledger(s) 124. In some implementations, the distributed computing platform may be Ethereum. In some implementations, the distributed computing platform may be the EOSIO platform. In some implementations, the virtual machine may be a Turing-complete and decentralized virtual machine.

Distributed ledger(s) 124 may act as a decentralized database that stores a registry of assets and transactions across one or more networks. A given asset may be owned by a particular user. An asset may include anything of material value or usefulness that is owned by or on behalf of a person or company, according to some implementations. In some implementations, a right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, a right to establish a (temporary) connection, and/or other rights.

In some implementations, distributed ledger(s) 124 may record ownership of assets. Alternatively, and/or simultaneously, distributed ledger(s) 124 may record transactions that modify ownership of assets. Alternatively, and/or simultaneously, distributed ledger(s) 124 may record (temporary) connections that have been established between tradeable items and user accounts, between tradeable items and virtual game-assets, and/or between other entities. In some implementations, an established connection may be a type of transaction. A smart contract may be a type of asset. In some implementations, once a smart contract has been added to the distributed ledger, the smart contract may be referred to as published, recorded, and/or posted. Elements of distributed ledger(s) 124 may be grouped together in units that are referred to as blocks. For example, an individual block may include one or more assets and one or more transactions.

Distributed ledger(s) 124 may be publicly accessible and append-only. In some implementations, existing blocks of a distributed ledger can substantially not be altered or deleted, unless multiple copies of the distributed ledger are altered. This is unlikely to happen provided that multiple copies of the distributed ledger are stored on different computing platforms, e.g., in different geographical locations. The distributed ledger may be replicated (in part or in its entirety) on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of an obtain component 108, an account link component 110, an asset link component 112, a modify component 114, game component 130, and/or other instruction components.

Gaming platform 126 may include one or more user accounts associated with one or more users. For example, the users may include a first user, a second user, a third user, and so forth. The one or more user accounts may include individual user information. The user information may include user identification information, location information, statistic information and/or other user information of the individual user accounts. The user identification information may include first name, last name, username, email address, phone number, and/or other user identification information for identifying individual users. In some implementations, the location information may be obtained from client computing platform(s) 104 of the one or more individual users. The location information may represent one or more real-world locations, e.g., of the one or more individual users in the real world, of one or more individual tradeable items in the real world, and/or of other entities in the real world. The real-world locations may be locations (e.g., addresses, GPS coordinates, landmarks, point on a virtual map, etc.) input by the individual users, location of an internet service provider (ISP) client computing platforms 104 associated with the individual users is using, location from a GPS of client computing platforms 104 associated with the individual users, location from a GPS of client computing platform 104 associated with the individual users when the tradeable items are in proximity to client computing platform 104, location of a GPS of client computing platform 104 associated with the individual users when client computing platform 104 identifies the tradeable items, and/or other real-world locations. In some implementations, a particular tradeable item may be associated with a particular location in the real world as its place of origin. For example, some tradeable items may originate from North America, whereas other tradeable items originate from Japan, South Africa, Australia, and/or other countries, regions, or locations. In some implementations, these places of origin may have a particular (location-specific) effect on the particular modification or enhancement that may result when a connection between a particular tradeable item and a selected game asset has been established. For example, an enhancement may be based on location-specific mythological creatures and/or powers.

In some implementations, the statistic information included in user information may include values for a date of an individual user joining a particular online gaming platform, current level of an individual user, experience points (XP), total number of tradeable items connected with an individual user account, total number of tradeable items currently connected with, total number of game assets in an inventory, number of hours played within the online gaming platform, number of hours played with a particular game asset, and/or other statistic information, as well as combinations thereof.

Electronic storage 118 may be configured to store individual item information associated with one or more tradeable items. The individual tradeable items may be identified by one or more item identifiers. The individual tradeable items may be real-world physical items. Tradeable items may include a first tradeable item, a second tradeable item, a third tradeable item, and so forth. By way of non-limiting example, the individual tradeable items may include a playing card, a toy figurine, and/or other real-world physical items. The one or more item identifiers may be item identifying information that identifies and distinguishes the tradeable items from each other. Physical manifestations of the one or more item identifiers may include a barcode, a quick response (QR) code, radio frequency identifier (RFID), serial number, and/or other human-readable or machine-readable identifiers. A first tradeable item may be a real-world physical item identified by a first item identifier and associated with first item information stored in electronic storage 118.

The individual item information stored in electronic storage 118 may include individual modification information that is useable to modify attribute information of one or more individual game assets. The modification information may include, for example, a set of code that, upon execution, performs a modification (e.g., an enhancement) to individual game assets, asset information, attribute information, and/or other information related to individual game assets. The game assets may be (collections and/or packages of) virtual items usable within an online gaming platform, such as gaming platform 126. By way of non-limiting example, the game assets may include one or more of a weapon, character, tool, pet, clothing, vehicle, mission, assignment, chapter, task, mini-game, and/or other virtual items. Game assets may be usable within gaming platform 126 by an owner of a right to usage within gaming platform 126. The owner of a first particular game asset may be a first user, the owner of a second particular game asset may be a second user, and so forth. The individual game assets may be defined by game asset information (also referred to as asset information). In some implementations, asset information may include one or more of the attribute information, a set of rules, and/or other information. In some implementations, attribute information may define one or more of a type of game asset, uses, impacts, aesthetics, and/or other attributes of the individual game assets. The attribute information of the individual game assets may be within at least one of the one or more (online) games. In some implementations, the set of rules may pertain to the individual game assets simultaneously being modified through more than one of the individual tradeable items. The set of rules may include a maximum number and/or value of tradeable items that can modify the individual game asset simultaneously, one or more types of tradeable item the individual game asset can be modified by, and/or other rules. By way of non-limiting example, in some implementations, the set of rules may only allow a game asset to by modified in accordance with one tradeable item at a time. The individual user accounts may include individual inventories of one or more game assets. The one or more game assets of the individual inventories may be game assets that the user account, or the user, owns, won, leases, found, stole, and/or otherwise possesses.

The individual item information associated with the individual tradeable items may further include one or more of a historical location record, a historical user record, user prerequisites, game asset prerequisites, a type of tradeable item, threshold information, and/or other item information. The historical location record may include the location information of the users whose user accounts have previously linked with the individual tradeable items, as described herein. The historical user record may include user information of the user accounts that the individual tradeable items have been previously linked with. These records are further described in the Detailed Description. The user prerequisites may be requirements for the user accounts that need to be satisfied for the user accounts to be linked with the individual tradeable items. In some implementations, the user prerequisites may be requirements for the user accounts that need to be satisfied before (attribute information of) game assets may be modified as described herein. The user prerequisites may include one or more of specific values of the statistic information, ranges of values of the statistic information, and/or other user prerequisites. For example, the first user may be required to complete a particular mission before their game asset may be modified in accordance with a tradeable item.

The game asset prerequisites may be requirements that need to be satisfied for a game asset to be modified by the one or more tradeable items. The game asset prerequisites may include values of the attribute information, ranges of values of the attribute information, and/or other game asset prerequisites. For example, the game asset to be modified must be a human character (i.e., a particular type) for it to be modified in accordance with a tradeable item. The types of tradeable items may be classifications of game assets with common characteristics. The type of tradeable item may specifically pertain to a particular online gaming platform, such as gaming platform 126. By way of non-limiting example, the types of tradeable items may include one or more of weapon modifiers, character modifiers, tool modifiers, vehicle modifiers, classical elements (i.e., water, fire, land, air), and/or other types depending on particular characteristics of gaming platform 126. The threshold information may include thresholds for the attribute information (e.g., types, uses, impacts, etc.). The thresholds may be associated with particular impact magnitudes that affect performance of individual modifications to the attribute information. For example, an airplane game asset may need to have separate cargo and passenger sections to transport people and objects simultaneously. The airplane game asset may further need to have a living quarter to be enhanced with a mattress.

Obtain component 108 may be configured to obtain one or more item identifiers of one or more tradeable items. The one or more item identifiers may be obtained upon the one or more users capturing an image that includes the item identifier via one or more associated client computing platform(s) 104. The one or more tradeable items may be obtained by the one or more users by way of purchase, trading, discovery, and/or other obtainment. By way of non-limiting example, obtain component 108 may obtain the first item identifier of the first tradeable item. The first tradeable item may be associated with first item information that includes first modification information.

Obtain component 108 may be configured to obtain user information of one or more user accounts. The user information may be obtained from client computing platform(s) 104 associated with the one or more users. In some implementations, the one or more users may be logged-in to gaming platform 126 via one or more associated client computing platform(s) 104 such that the one or more user information may be obtained by obtain component 108.

By way of non-limiting example, obtain component 108 may obtain first user information of a first user account. The first user account may be associated with a first user. The first user information may include one or more of first user identification information, first location information, first statistic information, and/or other user information of the first user account. The first location information may represent a first location. The first location may be a real-world location of the first user at the time the first user information is obtained by obtain component 108.

Account link component 110 may be configured to link one or more tradeable items with one or more user accounts within the online gaming platform such that item-account connections are established between the individual tradeable items and the individual user accounts. The linkage may be responsive to obtaining the individual item identifiers and the individual user information (e.g., the user identification information). By way of non-limiting example, account link component 110 may link the first tradeable item with the first user account within the gaming platform 126 such that a first item-account connection is established. The first user account may include a first inventory of game assets that includes a first game asset. The first item information may include a first historical location record that includes the location information of the users whose user accounts have previously linked with the first tradeable item (i.e., previous item-account connections for the first tradeable item). Upon the establishment of the first item-account connection, the first historical location record may include the first location information. In some implementations, individual user accounts may be linked with multiple tradeable items. In some implementations, individual tradeable items may be linked with multiple user accounts.

Account link component 110 may be configured to store item-account connections. Storing the item-account connections may include recording to a distributed ledger, storing in database(s), storing in electronic storage 118, and/or other storing using other storing mechanisms, components, and/or structures. By way of non-limiting example, in some implementations, account link component 110 may be configured to store the first item-account connection to distributed ledger 124. Distributed ledger 124 may be referenced to determine which user accounts are or have been connected with a particular tradeable item. Distributed ledger 124 may indicate which and/or when user accounts and tradeable items are and/or were actively connected, and/or disconnected, as well as other connection information.

Asset link component 112 may be configured to receive one or more indications of selections of individual game assets to be modified, e.g., based on individual modification information. The individual game assets selected may be from the individual inventories of game assets of the individual user accounts. In some implementations, the indications may be received from client computing platforms 104 associated with the individual users. As previously mentioned, the individual modification information may be included in the individual item information that is associated with the individual tradeable items such that the selected game assets are to be modified in accordance with the individual tradeable items. By way of non-limiting example, asset link component 112 may receive, from the first user, an indication of a selection of the first game asset from the first inventory of game assets to be modified based on the first modification information. The first modification information may be included in the first item information that is associated with the first tradeable item such that the first game asset is to be modified in accordance with the first tradeable item.

Asset link component 112 may be configured to link a selected game asset to be modified, based on individual modification information, with an associated individual tradeable item such that an item-asset connection may be established. By way of non-limiting example, asset link component 112 may link the first game asset with the first tradeable item such that a first item-asset connection is established. In some implementations, individual game assets may be linked with multiple tradeable items. In some implementations, individual tradeable items may be linked with multiple game assets.

Asset link component 112 may be configured to record the item-asset connections indicating individual game assets as being modified (or having been modified) in accordance with individual tradeable items. The item-asset connections may be recorded to distributed ledger 124, database(s) stored in electronic storage 118, and/or one or more other distributed ledgers. By way of non-limiting example, asset link component 112 may record, to distributed ledger 124, the first item-asset connection indicating the first game asset as being modified in accordance with the first tradeable item. The first game asset may include first asset information. The first asset information may include first attribute information. Distributed ledger 124 may be referenced to determine which game assets are or have been connected with a particular tradeable item. Distributed ledger 124 may indicate which and/or when game assets and tradeable items are and/or were actively connected, and/or disconnected, as well as other connection information.

Modify component 114 may be configured to obtain modification information from electronic storage 118. The obtainment may be by the individual item identifiers that identify the individual tradeable items and thus the individual modification information. Modify component 114 may be configured to obtain item information from electronic storage 118 based on the corresponding individual item identifiers. By way of non-limiting example, modify component 114 may obtain, based on the first item identifier, the first modification information from electronic storage 118.

Modify component 114 may be configured to perform one or more modifications of individual attribute information pertaining to one or more individual game assets such that the individual game assets are modified in accordance with the individual tradable items. The modifications may include a first modification, a second modification, a third modification, and so forth. The modifications to be performed upon the individual attribute information may be based on the individual modification information. The modifications of the individual attribute information may occur upon the establishment and/or storage of the individual item-asset connections. Modifying the attribute information may include one or more of adding uses, subtracting uses, adding impacts, subtracting impacts, increasing magnitude (i.e., power) of one or more impacts, decreasing magnitude (i.e., power) of one or more impacts, no change in the attribute information, and/or other modifications. In some implementations, performance of the one or more modifications may include storing the individual modifications to the user account of particular users, storing the individual modifications to the inventory of game assets of particular user accounts, storing the individual modifications to the user information of particular users, storing the individual modifications to distributed ledger 124, and/or others. By way of non-limiting example, modify component 114 may perform a first modification, based on the first modification information, of the first attribute information pertaining to the first game asset such that the first game asset is modified.

Obtain component 108 may be configured to obtain the first item identifier of the first tradeable item from a second user. Obtain component 108 may obtain second user information of a second user account. The second user account may be associated with the second user. The second user information may include one or more of second user identification information, second location information, second statistic information, and/or other user information of the second user account. The second location information may represent a second location. The second location may be a real-world location of the second user (e.g., at the moment a particular connection was established, such as a second item-account connection, described below).

In some implementations, account link component 110 may link the first tradeable item with the second user account within the gaming platform 126 such that a second item-account connection is established. The second user account may include a second inventory of game assets that includes a second game asset. Upon the establishment of the second item-account connection, the first historical location record may include (e.g., be appended by) the second location information. Thus, the first historical location record may indicate that the first tradeable item was at the first location and subsequently (i.e., most recently) at the second location. Account link component 110 may be configured to store the second item-account connection to distributed ledger 124. At this point, distributed ledger 124 may indicate that the first tradable item has linked with (and/or is currently linked with) the first user account and subsequently (i.e., most recently) the second user account. Distributed ledger 124 may include a chain of different connections and/or linkages pertaining to a particular tradeable item (along with different locations pertaining to individual connections).

Asset link component 112 may receive, from a client computing platform associated with the second user, an indication of a selection of a second game asset, from the second inventory of game assets, to be modified based on the first modification information. The second game asset may be defined by second asset information that includes second attribute information. Asset link component 112 may link the second game asset with the first tradeable item such that a second item-asset connection is established. Asset link component 112 may record the second item-asset connection to distributed ledger 124. At this point, distributed ledger 124 may indicate that the first tradable item has linked with (and/or is currently linked with) the first game asset and subsequently (i.e., most recently) with the second game asset.

Modify component 114 may be configured to perform a second modification, based on the first modification information, of the second attribute information pertaining to the second game asset such that the second game asset is modified in accordance with the first tradeable item. Subsequently, in some implementations, the (original) first modification applied to the first attribute information may be adjusted. For example, if the first modification was an enhancement of the first game asset, subsequent to the second modification, this first modification may be enhanced even more, or decreased, or reverted to its original status, and/or otherwise adjusted. The particular adjustment may be based on one or more factors, considerations, and/or rules, as described in this disclosure.

In some implementations, the adjustment to the first modification may be based on the establishment of the second item-asset connection that indicates another game asset (i.e., the second game asset) is being modified based on the first modification information. In some implementations, the adjustment to the first modification may be based on the establishment of the second item-account connection that indicates another user account (i.e., the second user account) linked with the first tradeable item. The adjustment may include ceasing the first modification, reducing the first modification (e.g., reducing a magnitude of one or more impacts, removing a use), enhancing the first modification (e.g., increasing a magnitude of one or more impacts, adding a use), and/or other adjustments.

Figure 3A:
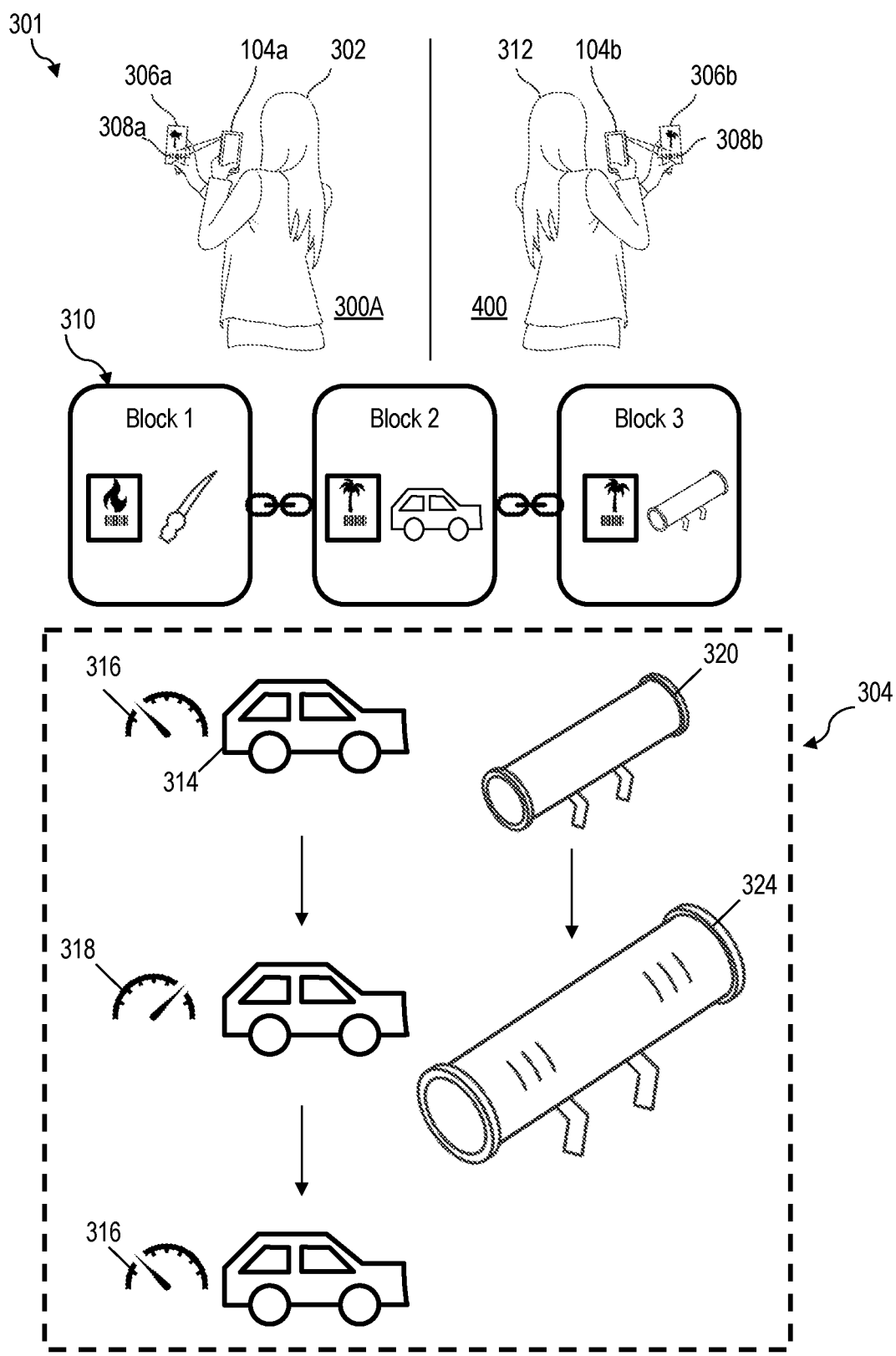
FIG. 3A illustrates an example implementation of the system configured for modifying game assets of an online gaming platform based on changes in ownership of tradeable items of users of the online gaming platform, in accordance with one or more implementations.

FIG. 3A-E illustrate example implementations of a system modifying game assets of an online gaming platform based on changes in ownership of tradeable items of users of the online gaming platform, in accordance with one or more implementations. FIG. 3A illustrates exemplary usage scenario 301 that includes both user 302 and user 312 linking with playing card 306a and playing card 306b, respectively, at different times. Playing card 306a and playing card 306b may be the same physical object. User 302 may have first possessed playing card 306a by way of purchase, trading, discovery, and/or other obtainment. Playing card 306a (i.e., tradeable item) may include barcode 308a (i.e., item identifier) printed on one side. Based on the previous possession of playing card 306a by user 302, distributed ledger 310 may include block 2 indicating that user 302's vehicle 314 (i.e., game asset from inventory of user 302) and playing card 306a have been linked at location 300A. System 100 may have obtained item information associated with playing card 306a from storage (similar to electronic storage 118 of FIG. 1) based on imaging barcode 308a with smartphone 104a. The item information may include the modification information (not pictured) that is utilized to perform modifications upon a particular game asset (i.e., attribute information thereof). Therefore, a modification has been performed upon vehicle 314 based on the modification information associated with playing card 306 such that speed 316 of vehicle 314 has been increased to speed 318. Subsequently, user 312 may image barcode 308b of playing card 306b with smartphone 104b at location 400. System 100 may obtain user information of user 312 based on a user account of user 312 within gaming platform 304. User 312 may be logged-in to gaming platform 304 such that the user information of user 312 may be obtained by system 100. Responsive to the obtaining of the user information of user 312 and the imaging of barcode 308b, an item-account connection may be established between the user account of user 312 and playing card 306 within gaming platform 304 and stored to a distributed ledger. User 312 may select bazooka 320 (i.e., game asset from inventory of user 312) to be modified based on the modification information associated with playing card 306b. Upon selection of bazooka 320, an item-asset connection may be established between bazooka 320 and playing card 306b within gaming platform 304 and stored to distributed ledger 310 at block 3. Upon establishing and storing the item-asset connection to distributed ledger 310 at block 3, bazooka 320 may be modified based on the modification information associated with playing card 306b such that bazooka 320 is enhanced into larger and more powerful bazooka 324. The modification information associated with playing card 306a and the modification information associated with playing card 306b may be the same. Consequently, because bazooka 320 was modified, the modification to speed 318 of vehicle 314 may cease and revert back to speed 316, as depicted in FIG. 3A.

Referring to FIG. 1, the performance of modifications based on modification information may be adjusted and/or otherwise varied based on one or more particular values such that the resulting modifications are a function of one or more of the historical location record, the user prerequisites, the game asset prerequisites, the historical user record, threshold information, subsequent item-account connections, subsequent item-asset connections, individual attribute information of the one or more game assets that the individual tradeable item has previously modified, the set of rules, the places of origin of individual tradeable items, and/or other factors. In some implementations, the modification information itself may be adjusted upon obtainment from electronic storage. Alternatively, and/or simultaneously, in some implementations, or one or more particular modifications effectuated by the modification information may be adjusted.

In some implementations, performing modification, based on the modification information, of the individual attribute information in accordance with individual tradeable items may be based on the set of rules, item-asset connections of the individual game assets recorded to the distributed ledger, the values of the types of the individual tradeable items of the item-asset connections involving the individual game assets recorded to the distributed ledger, the type of the individual tradeable items, and/or other values. The item-asset connections of the individual game assets present in distributed ledger 124 may indicate which particular tradeable item(s) the individual game assets are most currently being modified in accordance with. Based on these values, the performance of a modification, based on the modification information, of the attribute information may be rejected or permitted. In some implementations, based on the rejection to perform the modification of the attribute information, the item-asset connection and/or the item-account connection may expire, deactivate, be removed from distributed ledger 124, and/or another action may occur that indicate termination of the connections.

Figure 3B:
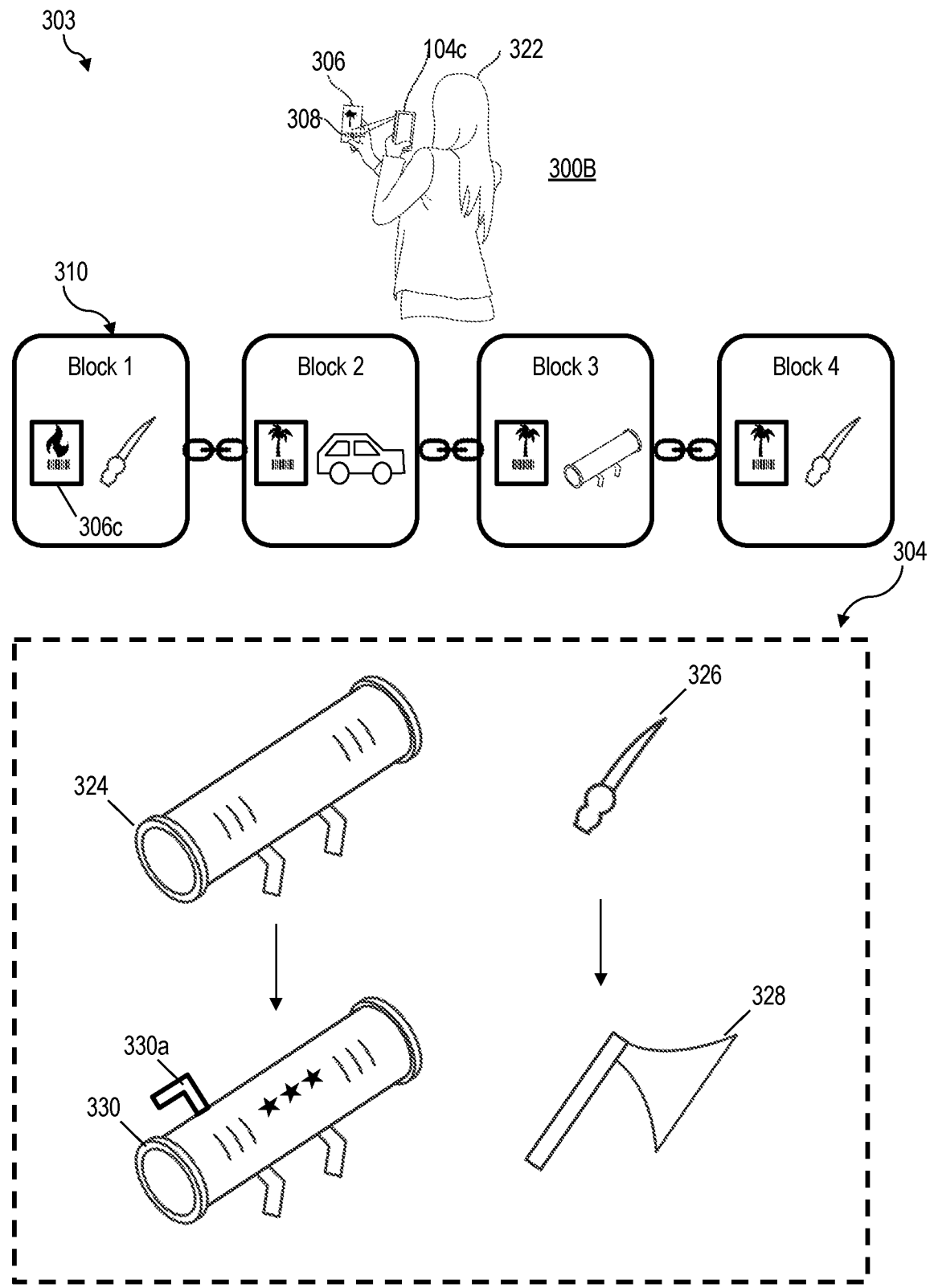
FIG. 3B illustrates an example implementation of the system configured for modifying game assets of an online gaming platform based on changes in ownership of tradeable items of users of the online gaming platform, in accordance with one or more implementations.

FIG. 3B may further illustrate the example implementation by way of exemplary usage scenario 303. Scenario 303 may include user 322 imaging barcode 308 of playing card 306 with smartphone 104*c* at location 300B. Playing card 306 may be the same physical item as playing card 306*a* and playing card 306*b* of FIG. 3A. Type of playing cards may include fire type, water type, air type, land type, and/or other types. Playing card 306 may be the land type. System 100 may obtain user information of user 322 based on a user account of user 322 within gaming platform 304. User 322 may be logged-in to gaming platform 304 such that the user information of user 322 may be obtained by system 100. Responsive to the obtaining of the user information of user 322 and the imaging of barcode 308, an item-account connection may be established between the user account of user 322 and playing card 306 within gaming platform 304 and stored to a distributed ledger. User 322 may have previously selected knife 326 to be modified in accordance with playing card 306*b* as indicated by block 1. Playing card 306*c* may be the fire type. Playing card 306*c* and playing card 306 may be different physical objects. User 322 may again select knife 326 to be modified based on the modification information associated with playing card 306. Upon selection of knife 326, an item-asset connection may be established between knife 326 and playing card 306 within gaming platform 304 and stored to distributed ledger 310 at block 4. Upon establishing and storing the item-asset connection to distributed ledger 310 at block 4, performance of a modification may be based on a set of rules associated with knife 326. The set of rules associated with knife 326 may limit knife 326 to be modified in accordance with a water and air type of tradeable item simultaneously or with a land and fire type of tradeable item simultaneously only. Based on distributed ledger 310, knife 326 is currently modified by the fire type at block 1. Thus, based on the set of rules associated with knife 326, knife 326 may be permitted to be modified in accordance with playing card 306 such that knife 326 is modified into machete 328. Consequently, because knife 326 and bazooka 324 are both categorized as weapons (i.e., type of game asset), bazooka 324 may further be modified based on the modification information such that bazooka 324 is enhanced into bazooka 330. The enhancement may include adding scope 330*a* (i.e., an impact).

Referring to FIG. 1, in some implementations, the individual modification information may be based on the individual user prerequisites of the individual tradeable items being met and further based on the values of the statistic information of the individual user information. By way of non-limiting example, the first item information may include a first set of user prerequisites that must be satisfied for the first tradeable item to be linked with the second user account. The first modification information may be adjusted based on the first set of user prerequisites being met and further based on values of the second statistic information. In other words, the first set of user prerequisites may require the second user have 2000+ XP (i.e., from the second statistic information), for example, for the performance of the second modification (based on the first modification information) to enhance a magnitude/power of a particular impact of the first game asset. Thus, upon the second user having 1999 XP or below, performance of the second modification may enhance the magnitude of the particular impact less than if the second user had 2000+ XP, or, e.g., not perform the second modification at all.

In some implementations, the performance of the individual modification information may be based on the individual game asset prerequisites of the individual tradeable items and the values of the attribute information of the individual game assets. The individual item information of the individual tradeable items may include game asset prerequisites that must be satisfied for one or more particular modifications based on the modification information associated with the individual tradeable item. By way of non-limiting example, a particular modification may add wings to a vehicle game asset thus adding an impact.

In some implementations, the modification information may be adjusted based on values of the individual attribute information of the one or more game assets that the individual tradeable item has previously caused to be modified. The one or more game assets the individual tradeable item has previously modified may be based on the item-asset connections and/or the item-account connections of the individual tradeable items recorded to the distributed ledger.

In some implementations, users may select a particular game asset to be modified. The modified game asset may be displayed to client computing platform 104 for the user to preview how the game asset is modified. The user may select whether to officially apply the modification to the game asset or not. Upon the user selecting to officially apply the modification, the item-asset connection between the tradeable item and the game asset may be established and recorded to distributed ledger 124.

Figure 3C:
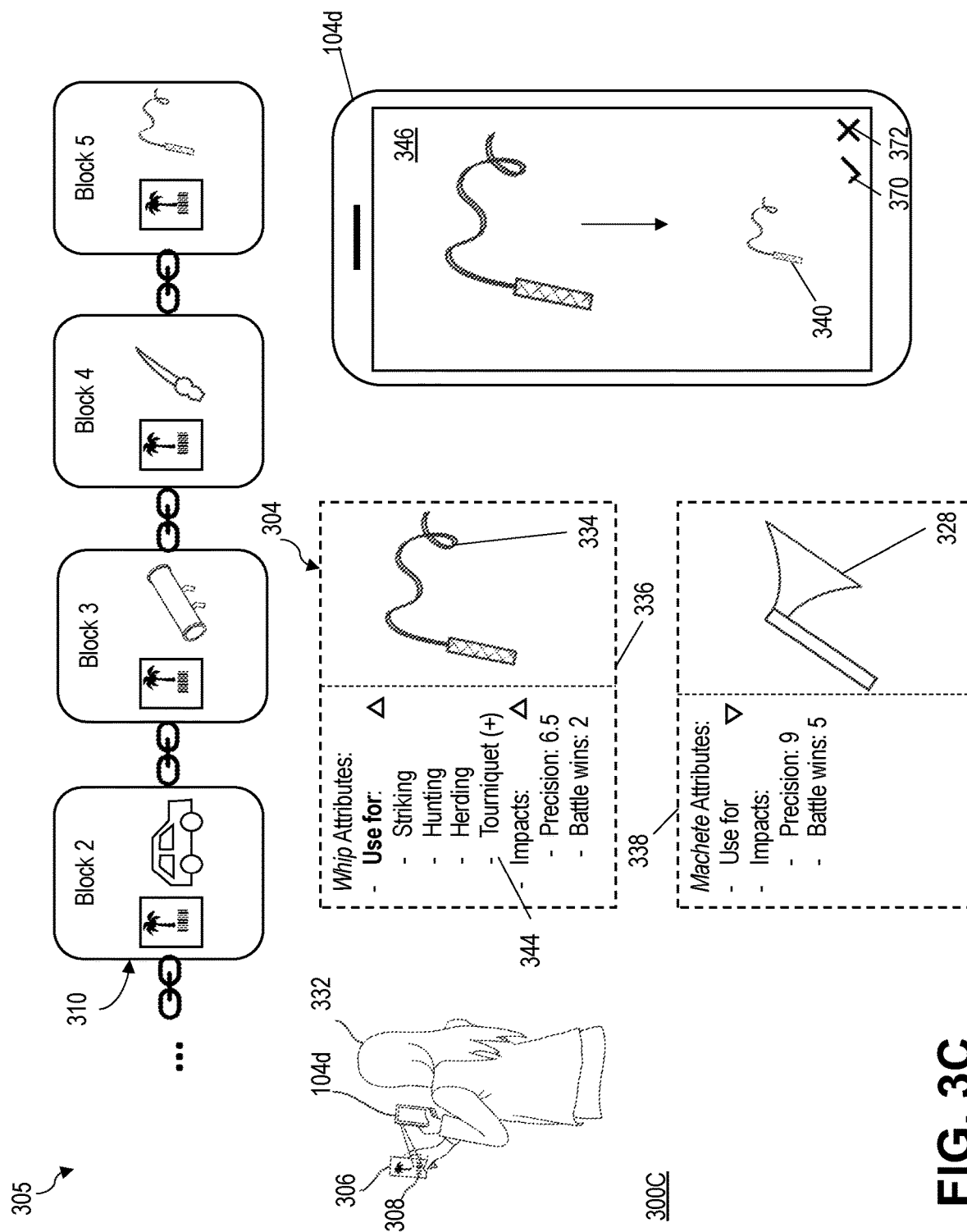
FIG. 3C illustrates an example implementation of the system configured for modifying game assets of an online gaming platform based on changes in ownership of tradeable items of users of the online gaming platform, in accordance with one or more implementations.

FIG. 3C may further illustrate the example implementation by way of scenario 305. Scenario 305 may include user 332 imaging barcode 308 of playing card 306 with smartphone 104*d* at location 300C. Playing card 306 may be the same physical item as playing card 306*a* and playing card 306*b* of FIG. 3A. System 100 may obtain user information of user 332 based on a user account of user 332 within gaming platform 304. User 332 may be logged-in to gaming platform 304 such that the user information of user 332 may be obtained by system 100. Responsive to the obtaining of the user information of user 332 and the imaging of barcode 308, an item-account connection may be established between the user account of user 332 and playing card 306 within gaming platform 304 and stored to a distributed ledger. User 332 may (provisionally) select whip 334 (i.e., game asset) to be modified based on the modification information associated with playing card 306. Whip 334 may be modified based on the modification information associated with playing card 306. Performance of a modification to whip 334 may be based on game asset prerequisites associated with playing card 306, attribute information 336 of whip 334, and attribute information 338 of machete 328 (i.e., most recently link game asset with playing card 306 before whip 334). The game asset prerequisites associated with playing card 306 may require that whip 334 have uses that pertain to animals. Attribute information 336 may include three uses of whip 334 pertaining to animals. Thus, whip 334 may be modified to additionally include using whip 334 as tourniquet 344. Furthermore, attribute information 338 may indicate that more battles have been won by machete 328 than by whip 334 and that machete 328 has higher precision than whip 334. Thus, modifying whip 334 may shrink whip 334 into whip 340. User 332 may view preview 346 via smartphone 104d that displays which modifications whip 334 might undergo in being modified into whip 340. User 332 may officially apply the modification to shrink whip 334 into whip 340 by selecting button 370 or reject the application of the modification by selecting button 372. Upon selection of button 370, an item-asset connection may be established between whip 334 and playing card 306 within gaming platform 304 and stored to distributed ledger 310 at block 5.

Referring to FIG. 1, in some implementations, the individual modification information may be adjusted based on the values of the statistic information of the user information that are a part of the individual historical user records of the individual tradeable items. In other words, an experienced user (as indicated by XP) that is indicated (by a historical user record) as the most recent user to have connected with a tradeable item may cause a game asset of the next user to connect to have a previously ceased modification restored.

By way of non-limiting example, the first item information may include a first historical user record. The first historical user record may include the user information of the user accounts that the first tradeable item has been previously linked with. The first historical user record may include a third user information that is associated with a third user account. The third user account may be associated with a third user. The third user information of the third user account may include third statistic information. Subsequently, the first modification information may be adjusted based on values of the statistic information of the user information (e.g., the third statistic information) that are a part of the first historical user record such that the first modification information may be used to modify (e.g., only slightly enhance) the first game asset because the third user had 250 XP, for example.

In some implementations, the performance of the individual modification information may be based on the individual historical location records of the individual tradeable items. For example, as mentioned above, the first historical location record may include the first location information that indicates the first location of the first user. The first location may be Tokyo, Japan. The performance of the first modification, based on first modification information, may be based on the first historical location record such that the first game asset (e.g., a weapon) is modified into a katana sword, for example, based on the first location in addition to other modifications based on the first modification.

In some implementations, the performance of the individual modification information may be based on distances between real-world locations of the users who have linked with a particular tradeable item. The location information may be obtained from the individual historical location records (e.g., by modify component 114). The performance of individual modifications of the attribute information pertaining to individual game assets may include modifying the impact included in the attribute information. The impact may be modified in accordance with an impact magnitude. The impact magnitude may be based on which distance between real-world locations of an individual tradeable item is greater. In other words, if the distance between the two most recent locations is greater than the distance between previous locations, the impact magnitude may correspond accordingly and be greater as well. In such a case, the further tradeable items travel in the real world between established connections, the greater the impact magnitude of the corresponding modification may be.

By way of non-limiting example, a first distance may be between the first location (i.e., represented by the first location information) and an initial real-world location (i.e., represented by the location information of the user account) of the user of an item-account connection established prior to the first item-account connection. A second distance may be between the first location (i.e., represented by the first information) and the second location (i.e., represented by the second location information). The performance of the second modification of the second attribute information may include modifying the impact of the second attribute information in accordance with an impact magnitude. The impact magnitude by which the impact of the second attribute information is modified may be based on which of the first distance and the second distance is greater.

In some implementations, modify component 114 may be configured to compare distances between the real-world locations of the users who have linked with a particular tradeable item. By way of non-limiting example, modify component 114 may compare the first distance and the second distance to determine which distance is greater.

In some implementations, modify component 114 may be configured to determine, based on a comparison of different distances as described herein, the impact magnitude by which the impact of the second attribute information is modified. In some implementations, the item information of individual tradeable items may include varying impact magnitudes such that a greater impact magnitude is associated with a greater distance (based on the comparison). By way of non-limiting example, the first item information may include a first impact magnitude and a second impact magnitude. The first impact magnitude may be associated with the second distance being greater than the first distance. The second impact magnitude may be associated with the first distance being greater than the second distance. For example, the first impact magnitude may be greater than the second impact magnitude. In some implementations, modify component 114 may determine whether the first impact magnitude or the second impact magnitude is the impact magnitude by which the impact of the second attribute information is modified.

In some implementations, based on a comparison of different distances as described herein, the second distance may be greater than the first distance. Thus, modifying the impact of the second attribute information may be in accordance with the first impact magnitude. In some implementations, based on the comparison, the first distance may be greater than the second distance. Thus, modifying the impact of the second attribute information may be in accordance with the second impact magnitude.

Figure 3D:
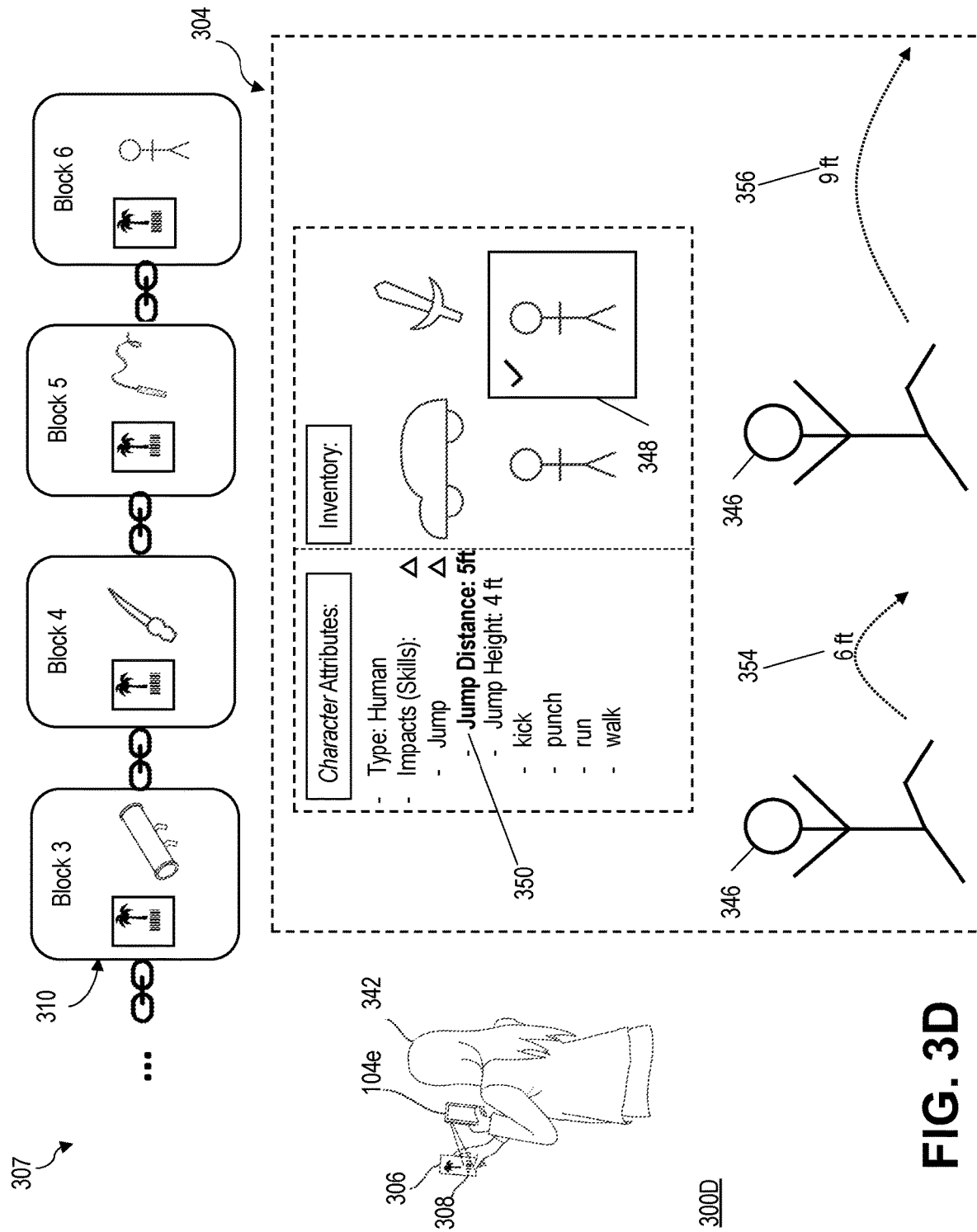
FIG. 3D illustrates an example implementation of the system configured for modifying game assets of an online gaming platform based on changes in ownership of tradeable items of users of the online gaming platform, in accordance with one or more implementations.

FIG. 3D may illustrate the example implementation by way of scenario 307. Scenario 307 may include user 342 imaging barcode 308 of playing card 306 with smartphone 104e at location 300D. Playing card 306 may be the same physical item as playing card 306a and playing card 306b of FIG. 3A. System 100 may obtain user information of user 342 based on a user account of user 342 within gaming platform 304. User 342 may be logged-in to gaming platform 304 such that the user information of user 342 may be obtained by system 100. Responsive to the obtaining of the user information of user 342 and the imaging of barcode 308, an item-account connection may be established between the user account of user 342 and playing card 306 within gaming platform 304 and stored to a distributed ledger 310. User 342 may select character 348 (i.e., a particular game asset) to be modified based on the modification information associated with playing card 306. Upon selection of character 348, an item-asset connection may be established between character 348 and playing card 306 within gaming platform 304 and stored to distributed ledger 310 at block 6. Performance of the modification to character 348 may be based on comparing the distance between location 300C (i.e., location where playing card 306 was last linked with a game asset in FIG. 3C) and location 300D and the distance between location 300B (in FIG. 3B) and location 300C. Upon the distance between locations 300C and 300D being greater than the distance between locations 300B and 300C, performance of the modification to character 348 may be in accordance with impact magnitude 356 instead of impact magnitude 354 associated with playing card 306. Upon comparison, it may be determined the distance between locations 300C and 300D is greater than distance between location 300B and location 300C. Thus, performance of modification to character 348 may be based on the distance between location 330D and location 330C such that jump distance 350 (i.e., impact) may be increased to jump distance 356.

Referring to FIG. 1, in some implementations, the performance of modifications, based on the individual modification information, may be based on the threshold information and values of the attribute information of a particular game asset. The threshold information may include one or more thresholds of the attribute information. The one or more thresholds may be associated with particular impact magnitudes. The impact magnitudes may affect the performance of the individual modifications. In other words, the more a game asset may measure up to, the more extreme a modification may be.

By way of non-limiting example, first threshold information of the first item information may include a first threshold associated with a third impact magnitude and a second threshold associated with a fourth impact magnitude. The first threshold may be greater than the second threshold. The third impact magnitude may be greater than the fourth impact magnitude.

Figure 3E:
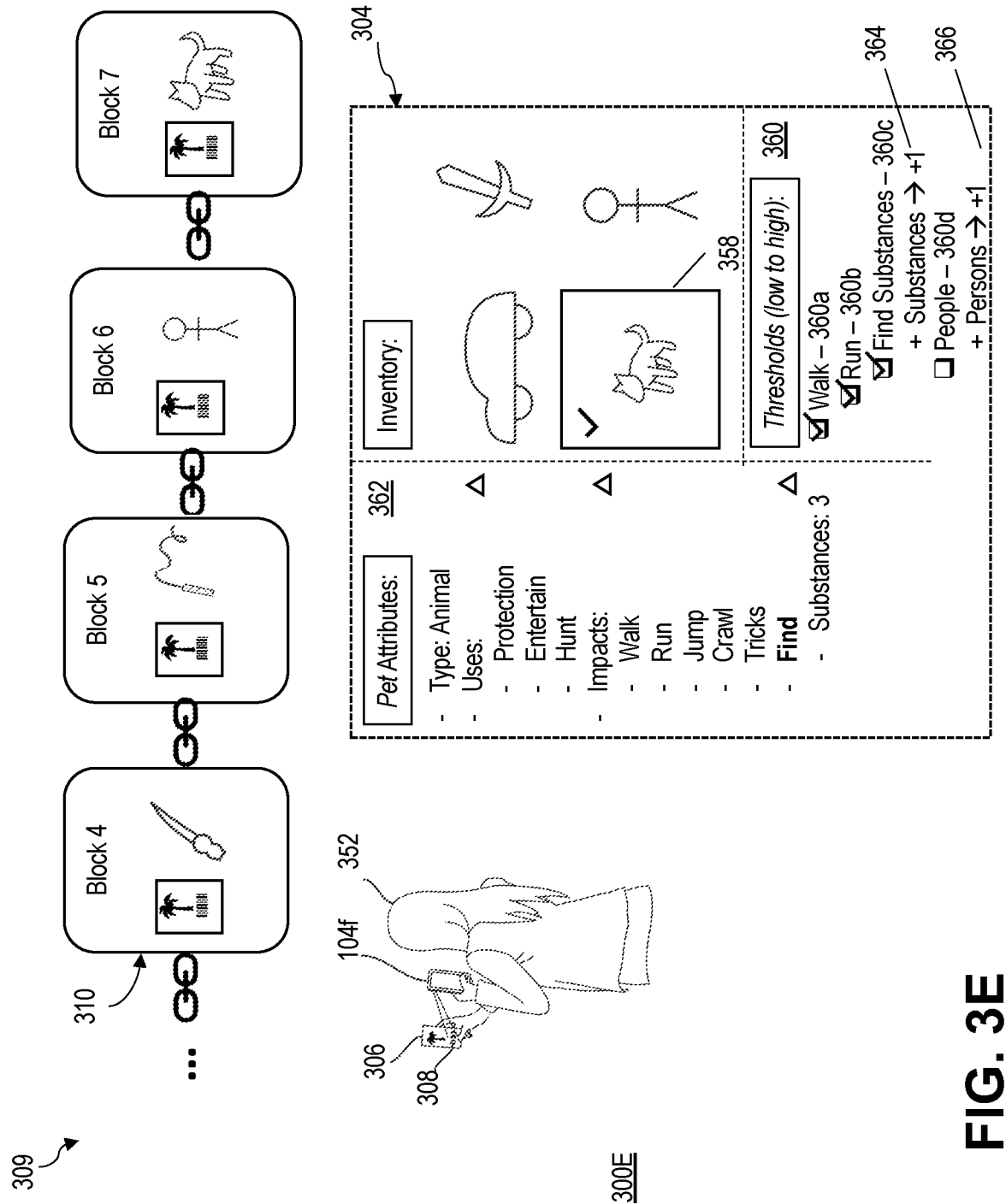
FIG. 3E illustrates an example implementation of the system configured for modifying game assets of an online gaming platform based on changes in ownership of tradeable items of users of the online gaming platform, in accordance with one or more implementations.

FIG. 3E may further illustrate and conclude the example implementation by way of scenario 309. Scenario 309 may include user 352 imaging barcode 308 of playing card 306 with smartphone 104f at location 300E. Playing card 306 may be the same physical item as playing card 306a and playing card 306b of FIG. 3A. System 100 may obtain user information of user 352 based on a user account of user 352 within gaming platform 304. User 352 may be logged-in to gaming platform 304 such that the user information of user 352 may be obtained by system 100. Responsive to the obtaining of the user information of user 352 and the imaging of barcode 308, an item-account connection may be established between the user account of user 352 and playing card 306 within gaming platform 304 and stored to a distributed ledger. User 352 may select animal 358 (i.e., a particular game asset in the user's inventory) to be modified based on the modification information associated with playing card 306. Upon selection of animal 358, an item-asset connection may be established between animal 358 and playing card 306 within gaming platform 304 and stored to distributed ledger 310 at block 7. Performance of the modification to animal 358 may be based on thresholds 360 of playing card 306 and attribute information 362. Impact magnitude 364 may add a substance that animal 358 may be able to find. Impact magnitude 366 may add a person that animal 358 may be able to find in one search. Thresholds 360a-360c must be satisfied for impact magnitude 364 to be applied to animal 358. Thresholds 360a-360d must be satisfied for impact magnitude 366 to be applied to animal 358. Attribute information 362 indicates that thresholds 360a-c are satisfied. Thus, performance of the modification includes adding a substance animal 358 may be able to find in accordance with impact magnitude 364 only.

Referring to FIG. 1, game component 130 may be configured to execute an instance of an online game within gaming platform 126. Game component 130 may be configured to implement the instance of the online game by receiving and executing commands based on user input (e.g., from users, through client computing platforms 104). At least part of the online game may take place in a virtual space that includes a simulated topography. The user input may be received from users through client computing platforms 104 associated with the users. Execution of the commands may facilitate interactions between the users. The execution of the commands may further facilitate locomotion of the one or more game assets controlled by the one or more users within the simulated topography of the virtual space. Implementing the instance of the online game may include determining view information for presentation of the online game to the players on client computing platforms 104.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 2:
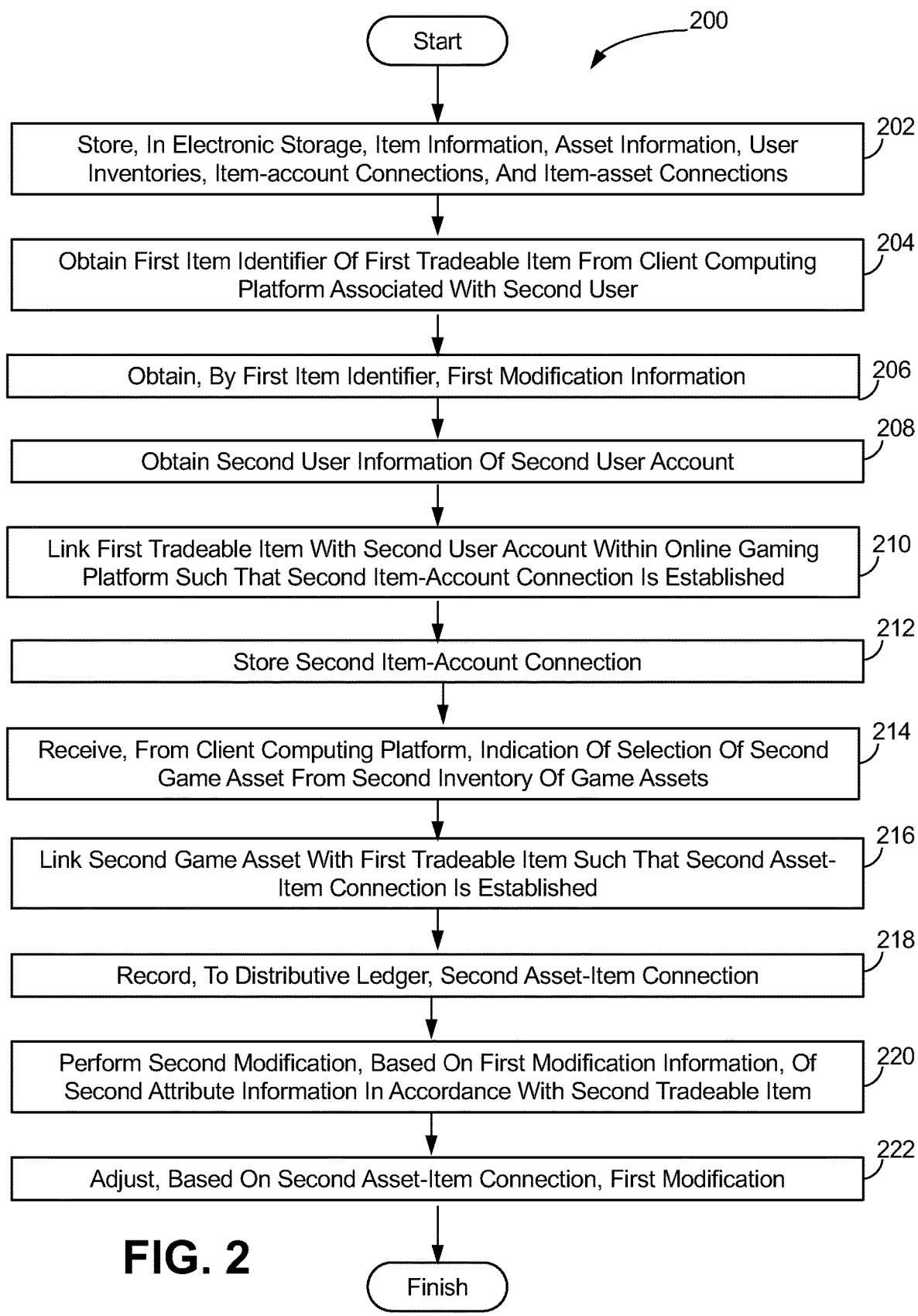
FIG. 2 illustrates a method for modifying game assets of an online gaming platform based on changes in ownership of tradeable items that are associated with user accounts of users of the online gaming platform, in accordance with one or more implementations.

FIG. 2 illustrates a method 200 for modifying game assets of an online gaming platform based on tradeable items that are associated with user accounts of users of the online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in electronic storage, item information, asset information, user inventories, item-account connections, and item-asset connections. Operation 202 may be performed by one or more hardware processors configured by machine-readable instructions including a component that is the same as or similar to electronic storage 118, in accordance with one or more implementations.

An operation 204 may include obtaining a first item identifier of the first tradeable item from a client computing platform associated with a second user. Operation 204 may be performed by one or more hardware processors configured by machine-readable instructions including a component that is the same as or similar to obtain component 108, in accordance with one or more implementations.

An operation 206 may include obtaining, by the first item identifier, the first modification information from the electronic storage. Operation 206 may be performed by one or more hardware processors configured by machine-readable instructions including a component that is the same as or similar to modify component 114 and electronic storage 118, in accordance with one or more implementations.

An operation 208 may include obtaining second user information of a second user account. The second user account may be associated with the second user. Operation 208 may be performed by one or more hardware processors configured by machine-readable instructions including a component that is the same as or similar to obtain component 108, in accordance with one or more implementations.

An operation 210 may include linking the first tradeable item with the second user account within the online gaming platform such that a second item-account connection is established. Operation 210 may be performed by one or more hardware processors configured by machine-readable instructions including a component that is the same as or similar to account link component 110, in accordance with one or more implementations.

An operation 212 may include storing the second item-account connection. Operation 212 may be performed by one or more hardware processors configured by machine-readable instructions including a component that is the same as or similar to account link component 110, in accordance with one or more implementations.

An operation 214 may include receiving, from the client computing platform, an indication of a selection of a second game asset from the second inventory of game assets to be modified based on the first modification information. Operation 214 may be performed by one or more hardware processors configured by machine-readable instructions including a component that is the same as or similar to asset link component 112, in accordance with one or more implementations.

An operation 216 may include linking the second game asset with the first tradeable item such that a second item-asset connection is established. Operation 216 may be performed by one or more hardware processors configured by machine-readable instructions including a component that is the same as or similar to asset link component 112, in accordance with one or more implementations.

An operation 218 may include recording, to a distributed ledger, the second item-asset connection indicating the second game asset as being modified in accordance with the first tradeable item. The second game asset may include second asset information. Operation 218 may be performed by one or more hardware processors configured by machine-readable instructions including a component that is the same as or similar to asset link component 112, in accordance with one or more implementations.

An operation 220 may include performing a second modification, based on the first modification information, of the second attribute information in accordance with the first tradeable item. Operation 220 may be performed by one or more hardware processors configured by machine-readable instructions including a component that is the same as or similar to modify component 114, in accordance with one or more implementations.

An operation 222 may include adjusting the first modification. The adjustment may be responsive to the establishment of the second item-asset connection. Operation 222 may be performed by one or more hardware processors configured by machine-readable instructions including a component that is the same as or similar to modify component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for modifying game assets within an online gaming platform based on tradeable items that are associated with user accounts of users of the online gaming platform, the system comprising:

electronic storage configured to store item information, asset information, user inventories, item-account connections, and item-asset connections, wherein the item information is associated with the tradeable items, the tradeable items being real-world physical items, the item information including:

item identifiers that identify individual tradeable items, and modification information that defines modifications which are applicable to the individual game assets in the online gaming platform, and wherein the asset information:

(i) defines the individual game assets, and (ii) includes attribute information that defines types, uses, and impacts of the game assets within the online gaming platform, wherein the types are classifications of game assets, wherein the user inventories indicate the game assets that are owned and/or possessed by the individual users within the online gaming platform, wherein the item-account connections are established connections between the tradeable items and the user accounts of the users of the online gaming platform, wherein the item-asset connections are established connections between the tradeable items and the game assets, wherein upon establishing the item-asset connections, the modification information is applied to the individual game assets, such that a first tradeable item is associated with first item information, wherein the first item information includes a first item identifier that identifies the first tradeable item and first modification information, wherein a first item-account connection has been established between the first tradeable item and a first user account of a first user, the first user account including a first inventory of game assets including a first game asset, wherein first attribute information pertains to the first game asset and defines type, uses, and impacts of the first game asset, wherein a first item-asset connection has been established between the first tradeable item and the first game asset, wherein a first modification is performed of the first attribute information based on the first modification information such that the first game asset is modified in accordance with the first tradeable item, wherein the first modification information is adjusted based on values of the attribute information of the game assets the first tradeable item has previously modified based on item-asset connections of the first tradeable item recorded to the distributed ledger; and one or more processors configured by machine-readable instructions to:

obtain the first item identifier of the first tradeable item from a client computing platform associated with a second user;

obtain, by the first item identifier, the first modification information from the electronic storage;

obtain second user information of a second user account, wherein the second user account is associated with the second user, and wherein the second user account includes a second inventory of game assets;

responsive to obtaining the first item identifier and the second user information from the second user, link the first tradeable item with the second user account within the online gaming platform such that a second item-account connection is established;

store the second item-account connection;

receive, from the client computing platform, an indication of a selection of a second game asset from the second inventory of game assets to be modified based on the first modification information, wherein the second game asset is defined by second asset information, the second asset information including second attribute information;

link the second game asset with the first tradeable item such that a second item-asset connection is established;

record, to a distributed ledger, the second item-asset connection indicating the second game asset as being modified in accordance with the first tradeable item;

perform a second modification, based on the first modification information, of the second attribute information such that the second game asset is modified in accordance with the first tradeable item; and adjust, responsive to establishment of the second item-asset connection, the first modification.

2. The system of claim 1, wherein the first user account includes first user information and the second user account includes the second user information, wherein the first user information includes first location information and the second user information includes second location information, wherein the first item information includes a first historical location record including location information of the users whose user accounts have previously linked with the first tradeable item, wherein the first historical location record includes the first location information upon the establishment of the first item-account connection and the second location information upon the establishment of the second item-account connection, wherein a first distance is determined between a first location represented by the first location information and an initial location represented by the location information of the user account of an item-account connection established prior to the first item-account connection, wherein a second distance is determined between the first location and a second location represented by the second location information, wherein the performance of the second modification of the second attribute information includes modifying the impact of the second attribute information in accordance with an impact magnitude, wherein the impact magnitude is based on which of the first distance and the second distance is greater, wherein a first impact magnitude is associated with the second distance being greater than the first distance and a second impact magnitude is associated with the first distance being greater than the second distance, wherein the first impact magnitude is greater than the second impact magnitude, wherein the one or more processors are further configured by machine-readable instructions to:
compare the first distance and the second distance to determine which is greater; and
determine, based on the comparison, whether the first impact magnitude or the second impact magnitude is the impact magnitude by which the impact of the second attribute information is modified.

3. The system of claim 2, wherein responsive to the second distance being greater than the first distance, the impact of the second attribute information is modified in accordance with the first impact magnitude.

4. The system of claim 2, wherein responsive to the first distance being greater than the second distance, the impact of the second attribute information is modified in accordance with the second impact magnitude.

5. The system of claim 1, wherein the adjustment to the first modification includes ceasing or reverting the first modification upon establishment of the second item-asset connection.

6. The system of claim 1, wherein the first item information includes first threshold information that includes thresholds for the attribute information that are associated with particular impact magnitudes that affect the performance of the first modification and the second modification such that the first threshold information includes a first threshold associated with a third impact magnitude and a second threshold associated with a fourth impact magnitude, wherein the first threshold is greater than the second threshold, wherein the third impact magnitude is greater than the fourth impact magnitude, wherein the performing of the second modification, based on the first modification information, of the second attribute information is based on values of the attribute information meeting the second threshold and not the first threshold such that the second modification is performed in accordance with the fourth impact magnitude which is less than the third impact magnitude.

7. The system of claim 1, wherein user information of the individual user accounts includes statistic information, the statistic information including values for a date of an individual user joining the online gaming platform, current level, experience points (XP), total number of tradeable items connected with, total number of tradeable items currently connected with, and/or total number of game assets in an inventory, wherein the first item information includes user prerequisites that must be satisfied for the first tradeable item to be linked with the second user account, wherein the user prerequisites include specific values and/or ranges of values of the statistic information of the second user information, wherein the performing of the second modification information, based on the first modification information, of the second attribute information is based on the user prerequisites being met and further based on values of the statistic information of the second user information.

8. The system of claim 1, wherein the first item information includes game asset prerequisites that must be satisfied for a particular modification of the first modification information, wherein the game asset prerequisites include values and/or ranges of values of the second attribute information wherein the performing of the second modification, based on the first modification information, of the second attribute information is based on the game asset prerequisites and values of the second attribute information.

9. The system of claim 1, wherein the first item information includes a type of the first tradeable item, wherein the second asset information includes a set of rules pertaining to the second game asset simultaneously being modified by more than one of the modification information of more than one of the tradeable items, the set of rules including a maximum value of tradeable items that can modify the second game asset simultaneously and/or one or more types of tradeable item the second game asset can be modified by wherein the performing of the second modification, based on the first modification information, of the second attribute information in accordance with the first tradeable item is based on the set of rules, item-asset connections of the second game asset recorded to the distributed ledger, the values of the types of the individual tradeable items of the item-asset connections involving the second game asset recorded to the distributed ledger, and/or a value of the type of the first tradeable item.

10. A method for modifying game assets within an online gaming platform based on tradeable items that are associated with user accounts of users of the online gaming platform, the method comprising:

storing, in electronic storage, item information, asset information, user inventories, item-account connections, and item-asset connections,
wherein the item information is associated with the tradeable items, the tradeable items being real-world physical items, the item information including:
item identifiers that identify individual tradeable items, and modification information that defines modifications which are applicable to the individual game assets in the online gaming platform, and wherein the asset information:
(i) defines the individual game assets, and
(ii) includes attribute information that defines types, uses, and impacts of the game assets within the online gaming platform, wherein the types are classifications of game assets, wherein the user inventories indicate the game assets that are owned and/or possessed by the individual users within the online gaming platform, wherein the item-account connections are established connections between the tradeable items and the user accounts of the users of the online gaming platform, wherein the item-asset connections are established connections between the tradeable items and the game assets, wherein upon establishing the item-asset connections, the modification information is applied to the individual game assets, such that a first tradeable item is associated with first item information, wherein the first item information includes a first item identifier that identifies the first tradeable item and first modification information, wherein a first item-account connection has been established between the first tradeable item and a first user account of a first user, the first user account including a first inventory of game assets including a first game asset, wherein first attribute information pertains to the first game asset and defines type, uses, and impacts of the first game asset, wherein a first item-asset connection has been established between the first tradeable item and the first game asset, wherein a first modification is performed of the first attribute information based on the first modification information such that the first game asset is modified in accordance with the first tradeable item, wherein the first modification information is adjusted based on values of the attribute information of the game assets the first tradeable item has previously modified based on item-asset connections of the first tradeable item recorded to the distributed ledger;

obtaining the first item identifier of the first tradeable item from a client computing platform associated with a second user;

obtaining, by the first item identifier, the first modification information from the electronic storage;

obtaining second user information of a second user account, wherein the second user account is associated with the second user, and wherein the second user account includes a second inventory of game assets;

responsive to obtaining the first item identifier and the second user information from the second user, linking the first tradeable item with the second user account within the online gaming platform such that a second item-account connection is established;

storing the second item-account connection;

receiving, from the client computing platform, an indication of a selection of a second game asset from the second inventory of game assets to be modified based on the first modification information, wherein the second game asset is defined by second asset information, the second asset information including second attribute information;

linking the second game asset with the first tradeable item such that a second item-asset connection is established;

recording, to a distributed ledger, the second item-asset connection indicating the second game asset as being modified in accordance with the first tradeable item;

performing a second modification, based on the first modification information, of the second attribute information such that the second game asset is modified in accordance with the first tradeable item; and adjusting, responsive to establishment of the second item-asset connection, the first modification.

11. The method of claim 10, wherein the first user account includes first user information and the second user account includes the second user information, wherein the first user information includes first location information and the second user information includes second location information, wherein the first item information includes a first historical location record including location information of the users whose user accounts have previously linked with the first tradeable item, wherein the first historical location record includes the first location information upon the establishment of the first item-account connection and the second location information upon the establishment of the second item-account connection, wherein a first distance is determined between a first location represented by the first location information and an initial location represented by the location information of the user account of an item-account connection established prior to the first item-account connection, wherein a second distance is determined between the first location and a second location represented by the second location information, wherein the performance of the second modification of the second attribute information includes modifying the impact of the second attribute information in accordance with an impact magnitude, wherein the impact magnitude is based on which of the first distance and the second distance is greater, wherein a first impact magnitude is associated with the second distance being greater than the first distance and a second impact magnitude is associated with the first distance being greater than the second distance, wherein the first impact magnitude is greater than the second impact magnitude, wherein the method further includes:

comparing the first distance and the second distance to determine which is greater; and determining, based on the comparison, whether the first impact magnitude or the second impact magnitude is the impact magnitude by which the impact of the second attribute information is modified.

12. The method of claim 11, wherein responsive to the second distance being greater than the first distance, the impact of the second attribute information is modified in accordance with the first impact magnitude.

13. The method of claim 11, wherein responsive to the first distance being greater than the second distance, the impact of the second attribute information is modified in accordance with the second impact magnitude.

14. The method of claim 10, wherein the adjustment to the first modification includes ceasing or reverting the first modification upon establishment of the second item-asset connection.

15. The method of claim 10, wherein the first item information includes first threshold information that includes thresholds for the attribute information that are associated with particular impact magnitudes that affect the performance of the first modification and the second modification such that the first threshold information includes a first threshold associated with a third impact magnitude and a second threshold associated with a fourth impact magnitude, wherein the first threshold is greater than the second threshold, wherein the third impact magnitude is greater than the fourth impact magnitude, wherein the performing of the second modification, based on the first modification information, of the second attribute information is based on values of the attribute information meeting the second threshold and not the first threshold such that the second modification is performed in accordance with the fourth impact magnitude which is less than the third impact magnitude.

16. The method of claim 10, wherein user information of the individual user accounts includes statistic information, the statistic information including values for a date of an individual user joining the online gaming platform, current level, experience points (XP), total number of tradeable items connected with, total number of tradeable items currently connected with, and/or total number of game assets in an inventory, wherein the first item information includes user prerequisites that must be satisfied for the first tradeable item to be linked with the second user account, wherein the user prerequisites include specific values and/or ranges of values of the statistic information of the second user information, wherein the performing of the second modification information, based on the first modification information, of the second attribute information is based on the user prerequisites being met and further based on values of the statistic information of the second user information.

17. The method of claim 10, wherein the first item information includes game asset prerequisites that must be satisfied for a particular modification of the first modification information, wherein the game asset prerequisites include values and/or ranges of values of the second attribute information wherein the performing of the second modification, based on the first modification information, of the second attribute information is based on the game asset prerequisites and values of the second attribute information.

18. The method of claim 10, wherein the first item information includes a type of the first tradeable item, wherein the second asset information includes a set of rules pertaining to the second game asset simultaneously being modified by more than one of the modification information of more than one of the tradeable items, the set of rules including a maximum value of tradeable items that can modify the second game asset simultaneously and/or one or more types of tradeable item the second game asset can be modified by wherein the performing of the second modification, based on the first modification information, of the second attribute information in accordance with the first tradeable item is based on the set of rules, item-asset connections of the second game asset recorded to the distributed ledger, the values of the types of the individual tradeable items of the item-asset connections involving the second game asset recorded to the distributed ledger, and/or a value of the type of the first tradeable item.

* * * * *